(12) United States Patent
Chen

(10) Patent No.: US 12,351,086 B2
(45) Date of Patent: Jul. 8, 2025

(54) SAFETY BELT ADJUSTMENT MECHANISM AND SAFETY SEAT USING THE SAME

(71) Applicant: BAMBINO PREZIOSO SWITZERLAND AG, Steinhausen (CH)

(72) Inventor: Yingzhong Chen, Steinhausen (CH)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 203 days.

(21) Appl. No.: 18/259,256

(22) PCT Filed: Dec. 21, 2021

(86) PCT No.: PCT/EP2021/086993
§ 371 (c)(1),
(2) Date: Jun. 23, 2023

(87) PCT Pub. No.: WO2022/136371
PCT Pub. Date: Jun. 30, 2022

(65) Prior Publication Data
US 2024/0075857 A1    Mar. 7, 2024

(30) Foreign Application Priority Data
Dec. 25, 2020    (CN) .......................... 202011559063.2

(51) Int. Cl.
*B60N 2/28*    (2006.01)
(52) U.S. Cl.
CPC ......... *B60N 2/2818* (2023.08); *B60N 2/2821* (2013.01); *B60N 2/2878* (2013.01)
(58) Field of Classification Search
CPC ... B60N 2/2818; B60N 2/2821; B60N 2/2878
See application file for complete search history.

(56) References Cited

U.S. PATENT DOCUMENTS 3,727,977 A    4/1973    Gmeiner
5,462,333 A    10/1995    Beauvais
(Continued)

FOREIGN PATENT DOCUMENTS

CA    2226002 A1    7/1998
CN    1066822 A    12/1992
(Continued)

OTHER PUBLICATIONS

International Search Report issued in corresponding International Application No. PCT/EP2021/086993, dated Apr. 7, 2022, pp. 1-3, European Patent Office, Rijswijk, Netherlands.
(Continued)

*Primary Examiner* — David R Dunn
*Assistant Examiner* — Tania Abraham
(74) *Attorney, Agent, or Firm* — HAUPTMAN HAM, LLP

(57) ABSTRACT

A safety belt adjustment mechanism for use on a safety seat. The seat including a backrest part and a seat part, each movable with respect to the seat base. The safety belt adjustment mechanism includes: a safety belt; a locking device on the seat part for locking the safety belt; a first pin on the seat part; and a second pin on the base; the first and second pins guide the safety belt; the safety belt passes through the locking device, around the first and second pins, and to the backrest part; and when the seat is adjusted from the sitting position to the lying position, the seat part moves toward the base to bring the first pin toward the base, such that a distance between the first and second pins shortens and the safety belt becomes loose without the locking device releasing the safety belt.

11 Claims, 3 Drawing Sheets

(56) References Cited

U.S. PATENT DOCUMENTS

| | | | |
|---|---|---|---|
| 5,899,534 A | 5/1999 | Gray | |
| 6,042,190 A | 3/2000 | Mathe et al. | |
| 6,871,908 B2 | 3/2005 | Takizawa | |
| 2004/0262966 A1 | 12/2004 | Hosoya | |
| 2008/0100122 A1 | 5/2008 | Bell et al. | |
| 2010/0038954 A1 | 2/2010 | Chen et al. | |
| 2017/0166097 A1* | 6/2017 | Mo | B60N 2/2875 |
| 2020/0346566 A1 | 11/2020 | Frank et al. | |

FOREIGN PATENT DOCUMENTS

| | | | |
|---|---|---|---|
| CN | 105083206 A | | 11/2015 |
| CN | 105438021 A | | 3/2016 |
| CN | 207291757 U | | 5/2018 |
| CN | 110015216 A | | 7/2019 |
| CN | 110126773 A | | 8/2019 |
| CN | 110466472 A | | 11/2019 |
| CN | 110520329 A | | 11/2019 |
| CN | 111267692 A | * | 6/2020 |
| DE | 3741831 A1 | | 6/1989 |
| DE | 4140620 A1 | | 6/1993 |
| DE | 102004048997 A1 | | 4/2006 |
| DE | 102006003652 B3 | | 5/2007 |
| DE | 202011000229 U1 | | 7/2011 |
| EP | 0545185 B1 | | 10/1996 |
| GB | 1184181 A | | 3/1970 |
| JP | S57205253 A | | 12/1982 |
| JP | 2002301961 A | | 10/2002 |
| JP | 2012025229 A | | 2/2012 |
| TW | 201210860 A | | 3/2012 |
| TW | 202224995 A | | 7/2022 |
| WO | 2005053998 A1 | | 6/2005 |

OTHER PUBLICATIONS

Chinese First Office Action issued in corresponding Chinese Application No. 2020115590632, dated Nov. 7, 2023, pp. 1-8.
Taiwanese First Office Action issued in corresponding Taiwanese Application No. 110147870, dated Aug. 19, 2023, pp. 1-3.
Maintenance and Selection of Aircraft Passenger Seats, dated Oct. 15, 2013.
Chinese Notice of Allowance issued in corresponding Chinese Application No. 202011559063.2, dated Jan. 30, 2024, pp. 1-7.

* cited by examiner

SAFETY BELT ADJUSTMENT MECHANISM AND SAFETY SEAT USING THE SAME

CROSS-REFERENCE TO RELATED APPLICATIONS

This application is a U.S. National Stage of International Application No. PCT/EP2021/086993, filed on Dec. 21, 2021, which claims priority to Chinese Application No. 202011559063.2 filed on Dec. 25, 2020, which are incorporated herein by reference in their entirety.

TECHNICAL FIELD

This disclosure relates to a safety seat, and particularly to a safety belt adjustment mechanism for the safety seat.

BACKGROUND

In a conventional safety seat with adjustable backrest angles, there is a general problem that the safety belt cannot be tightened or loosened automatically with the adjustment of the backrest angle. A user has to lock or release the safety belt every time after adjusting the angle of the backrest, which is very inconvenient.

At present, some safety seats equipped with a safety belt adjustment mechanism to adjust the tightness or looseness of the safety belt have also appeared on the market. However, most of the existing seat belt adjustment mechanisms have a relatively complicated structure. Moreover, the safety belt is often stuck due to the user's improper operation in a process of adjusting the angle of the seat.

SUMMARY

An object of one or more embodiments of the disclosure is to provide a safety belt adjustment mechanism for a safety seat.

According to a solution of at least one embodiment of the disclosure, a safety belt adjustment mechanism is provided. The safety belt adjustment mechanism is disposed on a safety seat. The safety seat includes a base and a seat. The seat is movably disposed on the base and is adjustable between a sitting position and a lying position, and the seat includes a backrest part and a seat part. The safety belt adjustment mechanism includes: a safety belt; a locking device disposed on a forepart of the seat part for locking or releasing the safety belt; a first pin; a second pin, wherein the first pin and the second pin are used to guide the safety belt; the safety belt passes through the locking device, around the first pin and the second pin, and extends to a front side of the backrest part along a rear side of the backrest part; and when the seat is adjusted from the sitting position to the lying position, the seat part moves in a direction approaching the base to bring the first pin on the seat part toward the direction approaching the base, such that a distance between the first pin and the second pin becomes shorter.

The foregoing and other objectives, features, aspects and advantages of the disclosure will become more apparent from the following detailed description of the disclosure when taken in combination with the accompanying drawings.

BRIEF DESCRIPTION OF THE DRAWINGS

The accompanying drawings are included herein to provide a further understanding of the disclosure, and are incorporated into this specification to constitute a part of this specification. The accompanying drawings show embodiments of the disclosure, and are used together with the following description to illustrate the concept of the disclosure.

In the drawings.

Figure 1:
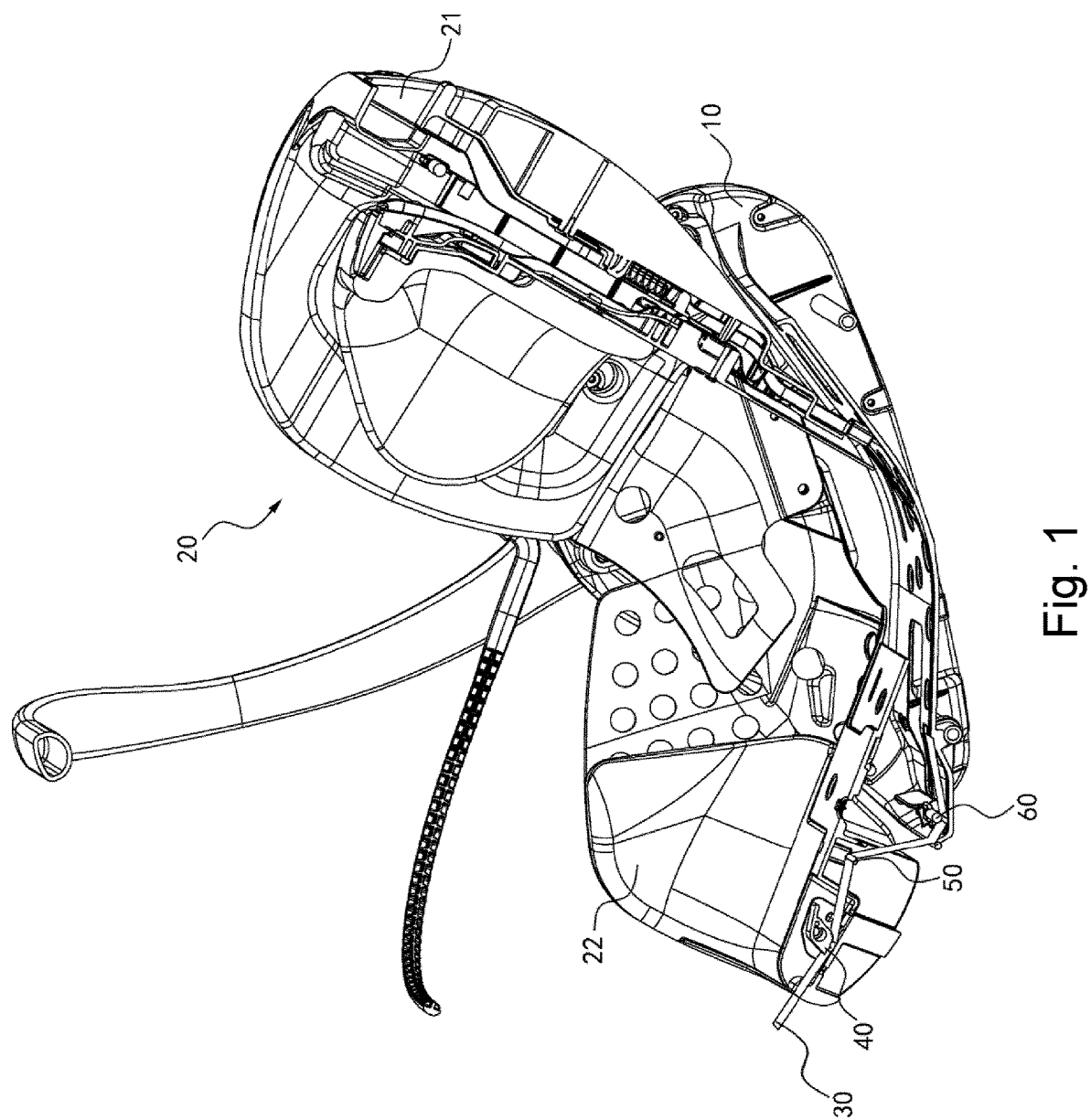
FIG. 1 is a perspective view of a safety seat at a sitting position according to an embodiment of the disclosure.
Figure 2:
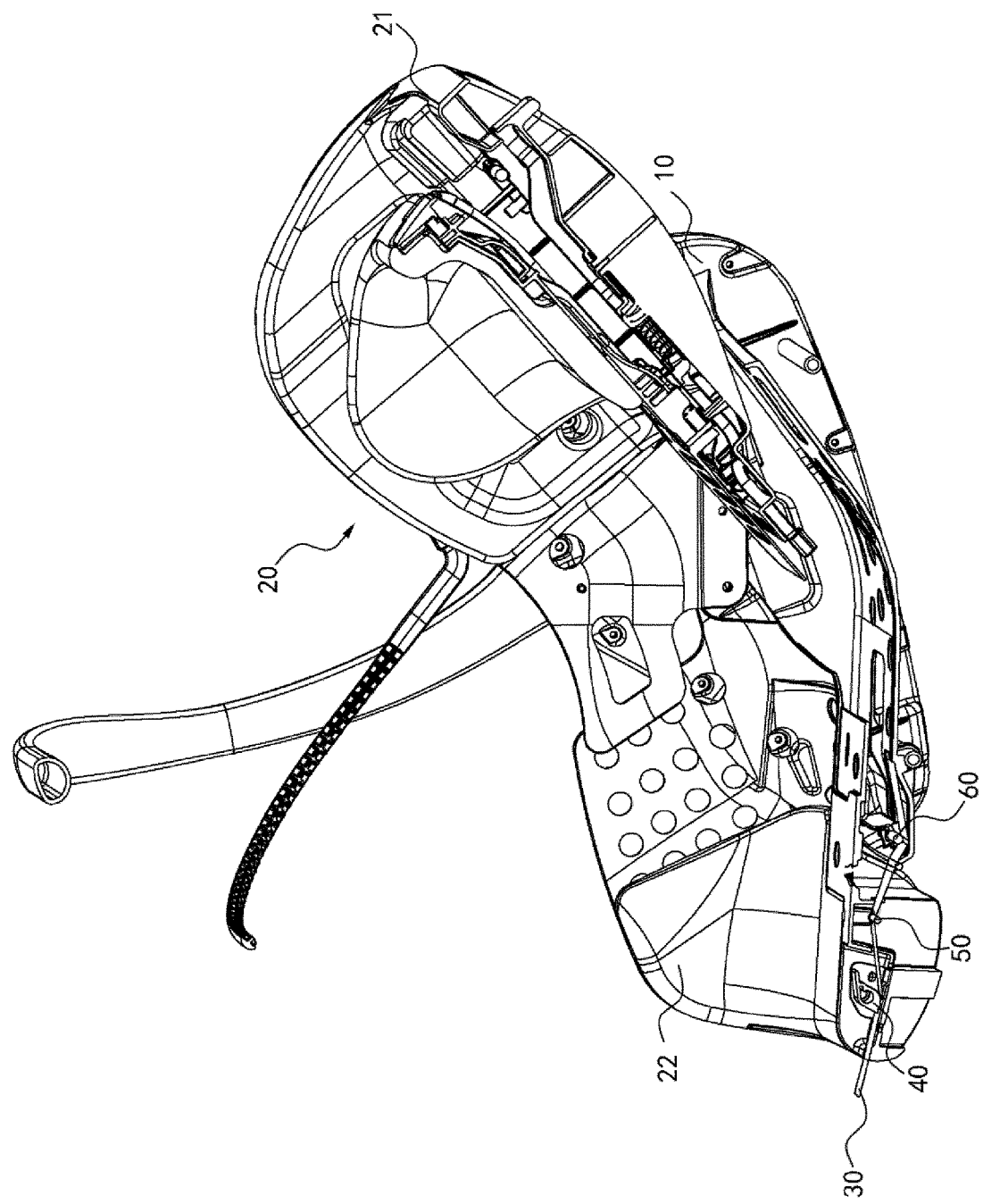
FIG. 2 is a perspective view of the safety seat at a lying position according to an embodiment of the disclosure.

Reference signs are listed as follows:
10 Base
101 Forepart
20 Seat
21 Backrest Part
211 Front Side
212 Rear Side
22 Seat Part
221 Forepart
30 Safety Belt
301 Adjustment Segment
302 Protection Segment
40 Locking Device
50 First Pin
60 Second Pin
O Pivot
t Distance

DETAILED DESCRIPTION

Now example embodiments will be described more fully with reference to the accompanying drawings. However, the example embodiments can be implemented in various forms, and should not be construed as being limited to the embodiments as set forth herein; on the contrary, these embodiments are provided so that the present disclosure will be comprehensive and complete, and fully convey the concept of the example embodiments to a person skilled in the art. Furthermore, the same reference numerals in the figures indicate the same or similar structures, and thus their detailed descriptions will be omitted.

The safety seat according to the disclosure includes a base 10 and a seat 20. The seat is movably disposed on the base 10 and can be adjusted between a sitting position and a lying position, such that the child sitting on the safety seat can change his/her posture between the sitting position and the lying position to satisfy the child's various needs.

The seat 20 includes a backrest part 21 and a seat part 22. Generally, the backrest part and the seat part are fixedly connected together, that is, an included angle between the backrest part and the seat part remains unchanged. According to an embodiment of the disclosure, the backrest part 21 and the seat part 22 can be movably connected together, that is, the included angle between them can be changed, which is beneficial to adjust the seat 20 more flexibly as required.

Figure 3:
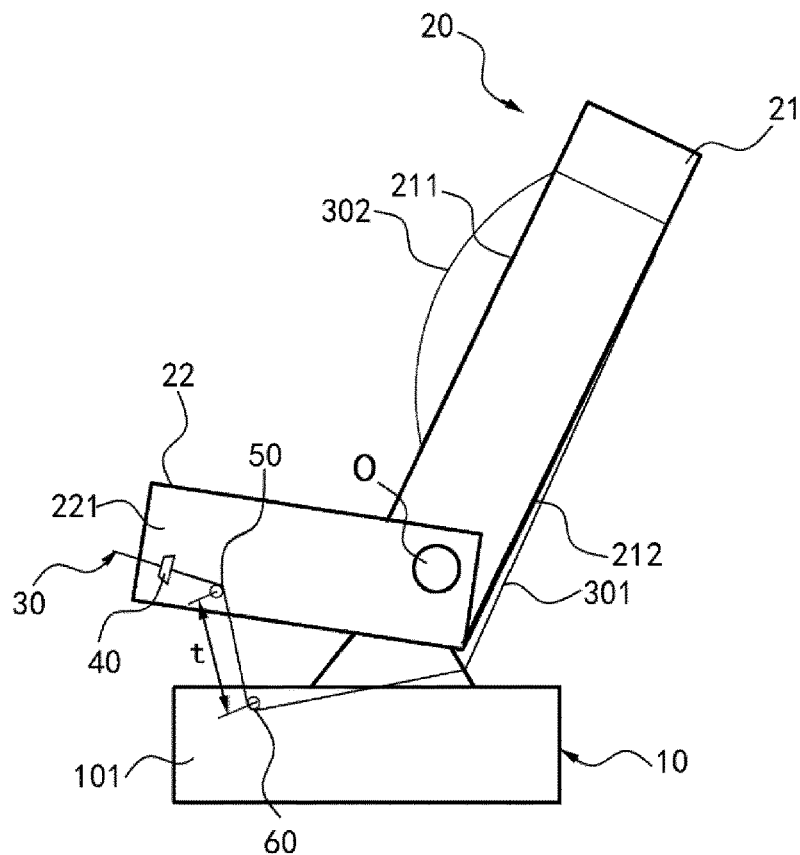
FIG. 3 shows a schematic view of a safety belt adjustment mechanism according to an embodiment of the disclosure when the safety seat is at the sitting position.
Figure 4:
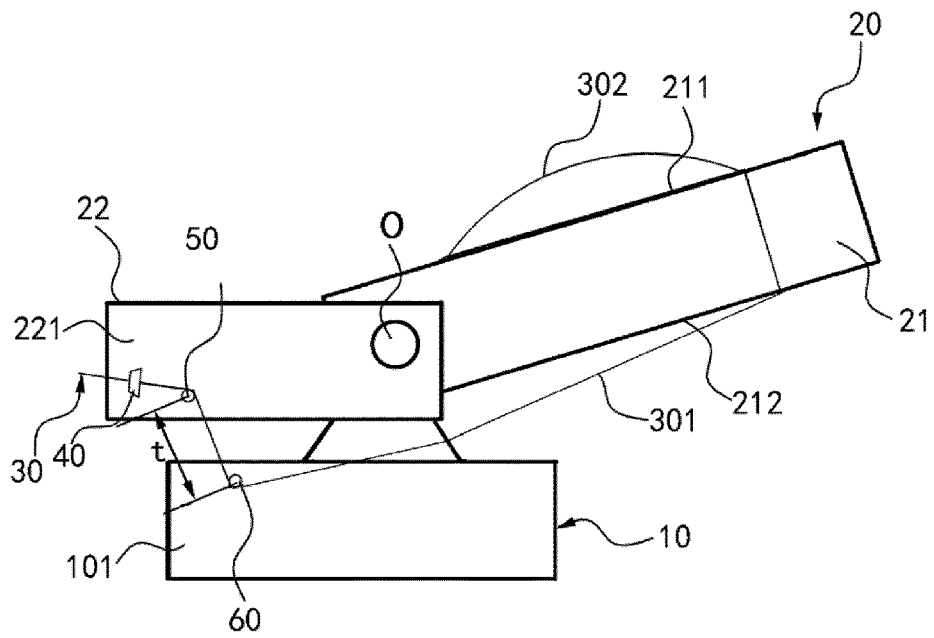
FIG. 4 shows a schematic view of the safety belt adjustment mechanism according to an embodiment of the disclosure when the safety seat is at the lying position.

In one embodiment as shown in FIGS. 3 and 4, both the backrest part 21 and the seat part 22 are pivotally connected at a pivot O of the base 10, such that the backrest part 21 and the seat part 22 may each be angularly adjusted with respect to the base 10. When the seat 20 is adjusted from the sitting position to the lying position, the backrest part 21 may be pivoted backward about the pivot O, and the seat part 22 may be pivoted about the pivot O in a direction approaching the base 10. It should be noted that "front" in the disclosure refers to a direction in which the safety seat is facing (i.e., the leftward direction in FIGS. 3 and 4); and "rear" in the disclosure refers to a direction in which the safety seat is facing away (i.e., the rightward direction in FIGS. 3 and 4).

It should be understood that the disclosure is not limited to the above embodiment.

Specifically, in another embodiment, the backrest part 21 and the seat part 22 may be pivotally connected at two pivots (not shown) on the base 10, or alternatively, the backrest part 21 and the seat part 22 may be movably connected to the base 10 in other ways different from the pivotal connection (e.g., a linkage mechanism, not shown), as long as whenever the seat 20 is adjusted from the sitting position to the lying position, the seat part 22 can move in a direction approaching the base 10. In a further embodiment, the backrest part 21 and the seat part 22 may also form a linkage, and when the backrest part 21 moves backward, the seat part 22 may be brought to move closer to the base 10 by the linkage.

A safety belt adjustment mechanism is disposed on the safety seat. The safety belt adjustment mechanism of an embodiment of the disclosure includes a safety belt 30, a locking device 40, a first pin 50, and a second pin 60. As best seen in FIGS. 3 and 4, the safety belt 30 sequentially passes through the locking device 40, around the first pin 50 and the second pin 60, and extends to a front side 211 of the backrest part 21 along a rear side 212 of the backrest part 21. More specifically, the safety belt 30 extends upward along the rear side 212 of the backrest part 21 after passing around the first pin 50 and the second pin 60, and then slidably passes through an opening disposed at a position of the backrest part 21 corresponding to the child's shoulder, so as to arrive to a front side 211 of the backrest part 21, and is finally fixed to a fixing place of the front side 211, thereby restricting the child in a seating space formed by the seat 20.

In one embodiment, the safety belt 30 may include an adjustment segment 301 for adjusting the tightness of the safety belt 30 and a protection segment 302 for protecting the child, as best seen in FIGS. 3 and 4. Among them, one end of the adjustment segment 301 is exposed in front of the seat part 22, so as to facilitate the user to adjust the tightness of the safety belt 30 by pulling the adjustment segment 301; and the other end of the adjustment segment 301 passes through the locking device 40, around the first pin 50 and the second pin 60, and then is connected to the protection segment 302 on a rear side 212 of the backrest part 21. The adjustment segment 301 can be connected to the protection segment 302 in a variety of ways, for example, the adjustment segment 301 can be directly connected (such as stitched) to the protection segment 302; or alternatively, the adjustment segment 301 may be detachably connected to the protection segment 302 through a connecting piece such as a bridge sheet, but the disclosure is not limited thereto. In addition, the protection segment 302 of the disclosure may be provided in two segments. It should be understood, the adjustment segment 301 and the protection segment 302 may also be integrally formed as a single segment in at least one embodiment.

The locking device 40 is disposed at a forepart 221 of the seat part 22 for locking or releasing the safety belt 30. When the locking device 40 locks the safety belt 30, the safety belt has a constant use length, thereby stably fixing the child on the safety seat. When the locking device 40 releases the safety belt 30, the safety belt 30 has an adjusted use length, so as to facilitate fastening or releasing the safety belt for the child and adjusting the tightness of the safety belt. According to at least one embodiment of the disclosure, the use length of the safety belt 30 refers to the length of the safety belt 30 extending from the locking device 40 to the front side 211 of the backrest part 21 after the locking device 40 locks the safety belt 30. In one embodiment, the fixing place of the front side 211 may be a safety belt buckle of the safety seat.

The first pin 50 is disposed on the seat part 22, and the second pin 60 is disposed on the base 10. Since the safety belt 30 successively extends around the first pin 50 and the second pin 60, the first pin 50 and the second pin 60 have a guiding effect on the safety belt 30, and provide a smooth path for the safety belt, thereby avoiding a risk of the safety belt being knotted during use and endangering the safety of the child.

As shown in FIGS. 1 to 4, the first pin 50 is disposed on the seat part 22 of the seat 20. In at least one embodiment, the first pin 50 may be disposed on the forepart 221 of the seat part 22. In another embodiment, the first pin 50 may be disposed in an interior or on a bottom surface of the forepart 221 of the seat part 22. In one embodiment of the disclosure, the first pin 50 may be disposed between the locking device 40 and the pivot O, at a position close to the locking device 40. In one embodiment, the locking device 40 and the first pin 50 can also be one component, that is, the locking device 40 can also function as the first pin 50. The second pin 60 is disposed on the base 10. In at least one embodiment, the second pin 60 may be disposed on the forepart 101 of the base 10. In another embodiment, the second pin 60 may be disposed in an interior or on a top surface of the forepart 101 of the base 10. It can be seen from FIGS. 3 and 4, the seat part 22 is pivotally connected at the pivot O of the base 10 and pivots about the pivot O. When the seat 20 is adjusted from the sitting position to the lying position, the seat part 22 is pivoted about the pivot O toward the direction approaching the base 10, that is, the forepart 221 of the seat part 22 is pivoted toward the direction approaching the base 10, such that a distance t between the first pin 50 and the second pin 60 in FIG. 4 becomes shorter with respect to a distance t in FIG. 3.

In addition, the first pin 50 and the second pin 60 are not limited to cylindrical in the shape, and may be a cylindrical shape with a groove, or the like, as long as the safety belt 30 can smoothly pass around.

Hereinafter, the embodiment shown in FIGS. 3 and 4 will be taken as an example to describe the variation of the distance t between the first pin 50 and the second pin 60 and its effect during the process of adjusting the seat 20 from the sitting position to the lying position according to at least one embodiment of the disclosure.

In order to make a clear interpretation, an entire advancing route of the safety belt 30 from the locking device 40 to the fixing place at the front side 211 of the backrest part 21 is divided into three distances, a distance from the locking device 40 to the first pin 50 is defined as a first distance, a distance from the first pin 50 to the second pin 60 is defined as a second distance, and a distance from the second pin 60 to the fixing place of the front side 211 of the backrest part 21 is defined as a third distance.

When the seat 20 is in the sitting position, the child sits in the seat 20. After the safety belt 30 is fastened, the user may tighten an exposed end of the adjustment segment 301 to adjust the overall tightness of the safety belt 30, such that the child sitting in the seat 20 is comfortable in a fixed state, and the locking device 40 may lock the safety belt 30 accordingly to maintain the current use length. At this time, the use length of the safety belt 30 is equal to a sum of the first distance, the second distance, and the third distance.

When the seat 20 is adjusted to the lying position, the backrest part 21 is pivoted backward about the pivot O with respect to the base 10, the forepart 221 of the seat part 22 is pivoted about the pivot O in a direction approaching the base 10, and the first pin 50 fixedly disposed on the seat part 22 moves in a direction approaching the base 10 along with the movement of the seat part 220, such that the distance t between the first pin 50 and the second pin 60 becomes shorter, that is, the second distance becomes shorter. Since the use length of the safety belt 30 is not changed, and the first distance is constant, the third distance becomes longer. In this process, as the second distance becomes shorter and the third distance becomes longer, the safety belt 30 at the third distance is loosened in comparison with the sitting position.

Therefore, with the safety belt adjustment mechanism of the disclosure, when the seat is adjusted from the sitting position to the lying position, the safety belt 30 can become loose without having the locking device 40 release the safety belt 30. This not only allows the user to adjust the position of the seat 20 in a time-saving and labor-saving manner, but also ensures that the child is not improperly impacted during the adjustment process, thereby improving comfort.

The foregoing embodiments and advantages are only examples and cannot be regarded as a limitation of the disclosure. The description herein is intended to illustrate, rather than to limit the scope of the claims. For the person skilled in the art, various alternatives, variations and modifications are obvious. The features, structures, methods, and other characteristics of the example embodiments described herein can be combined in various ways to obtain other and/or alternative example embodiments.

The beneficial effect of the disclosure is providing a seat belt adjustment mechanism with a simple structure and easy operation. When the seat is adjusted from the sitting position to the lying position, the safety belt can become loose without having the locking device release the safety belt, which not only saves time and effort for the user to adjust the position of the seat, but also ensures that the child is not improperly impacted during the adjustment process, thereby improving comfort.

Since the characteristics of the disclosure can be embodied in various forms without departing from the characteristics of the disclosure, it should also be understood that the above embodiments are not limited to any details described above unless otherwise noted, and the embodiments should be interpreted broadly as being within the scope defined by the appended claims. Therefore, all modifications and alterations falling within the scope and limits of the claims or equivalent solutions of such scope and limits shall be covered by the appended claims.

What is claimed is:

1. A safety belt adjustment mechanism disposed on a safety seat, the safety seat including a base and a seat, the seat being movably disposed on the base and being adjustable between a sitting position and a lying position, the seat including a backrest part and a seat part, wherein the safety belt adjustment mechanism comprises:
    a locking device disposed on a forepart of the seat part, for locking or releasing a safety belt of the safety seat;
    a first pin disposed on the seat part; and
    a second pin disposed on the base,
    wherein,
    the first pin and the second pin are used to guide the safety belt;
    in use, the safety belt sequentially passes through the locking device, around the first pin and the second pin, and extends to a front side of the backrest part along a rear side of the backrest part; and
    when the seat is adjusted from the sitting position to the lying position, the seat part moves in a direction approaching the base to bring the first pin on the seat part toward a direction approaching the base, such that a distance between the first pin and the second pin becomes shorter.

2. The safety belt adjustment mechanism according to claim 1, wherein the backrest part and the seat part pivotally connect at a pivot of the base.

3. The safety belt adjustment mechanism according to claim 2, wherein the first pin is disposed between the locking device and a pivot of the base, and the first pin is at a position close to the locking device.

4. The safety belt adjustment mechanism according to claim 1, wherein the backrest part and the seat part each are angularly adjustable with respect to the base.

5. The safety belt adjustment mechanism according to claim 1, wherein when the seat is adjusted from the sitting position to the lying position, the locking device is in a locked state.

6. The safety belt adjustment mechanism according to claim 1, wherein the first pin is disposed on the forepart of the seat part.

7. The safety belt adjustment mechanism according to claim 1, wherein the locking device and the first pin are one component.

8. The safety belt adjustment mechanism according to claim 1, wherein the second pin is disposed on a forepart of the base.

9. The safety belt adjustment mechanism according to claim 1, wherein the safety belt includes an adjustment segment for adjusting a tightness of the safety belt and a protection segment for protecting a child, wherein the adjustment segment and the protection segment are connected with each other on a rear side of the backrest part.

10. A safety seat, wherein the safety seat uses the safety belt adjustment mechanism according to claim 1.

11. A safety seat having a safety belt adjustment mechanism, the safety seat including a base and a seat, the seat being movable on the base, the seat having a sitting position and a lying position, the seat including a backrest part and a seat part, the safety belt adjustment mechanism comprising:
    a safety belt;
    a locking device on a forepart of the seat part and configured to lock or release the safety belt received by the locking device;
    a first pin on the seat part; and
    a second pin on the base,
    wherein the locking device, the first pin, and the second pin are arranged to receive the safety belt and sequentially pass the safety belt through the locking device, around the first pin and the second pin, and to a front side of the backrest part by way of a rear side of the backrest part; and
    wherein when the seat is adjusted from the sitting position to the lying position, the seat part moves toward the base thereby bringing the first pin toward the base such that a distance between the first pin and the second pin is reduced.

* * * * *